United States Patent [19]
van Trigt

[11] Patent Number: 5,905,543
[45] Date of Patent: May 18, 1999

[54] COLOR VIDEO SYSTEM WITH ILLUMINANT-INDEPENDENT PROPERTIES

[76] Inventor: Cornelius Henricus Petrus van Trigt, Saturnus 8, 5591 PB Heeze, Netherlands

[21] Appl. No.: 08/760,653

[22] Filed: Dec. 4, 1996

Related U.S. Application Data

[63] Continuation-in-part of application No. 08/700,542, filed as application No. PCT/NL94/00049, Feb. 28, 1994.

[51] Int. Cl.$^6$ ..................................................... H04N 9/64
[52] U.S. Cl. ......................... 348/708; 348/642; 348/453; 348/386; 348/222
[58] Field of Search .................................. 348/222, 223, 348/227, 655, 262, 488, 708, 712, 713, 493, 264, 391–393, 453, 385, 386, 642, 659, 662, 255, 234; 382/166, 167, 162; 358/500, 509, 519, 520; H04N 11/00, 9/64

[56] References Cited

U.S. PATENT DOCUMENTS

| | | | |
|---|---|---|---|
| 4,574,303 | 3/1986 | Hashimoto et al. | 358/29 |
| 5,058,040 | 10/1991 | Tajima | 364/521 |
| 5,351,079 | 9/1994 | Usui | 348/223 |
| 5,408,595 | 4/1995 | Tajima | 395/131 |
| 5,638,084 | 6/1997 | Kalt | 345/31 |

FOREIGN PATENT DOCUMENTS

| | | | |
|---|---|---|---|
| 406078320 | 3/1994 | Japan | H04N 9/64 |

OTHER PUBLICATIONS

C. van Trigt, Smoothest reflectance functions: I. Definition and main results, J. Opt. Soc. Am. A, vol. 7, No. 10, pp. 1891–1904 (Oct. 1990).

C. van Trigt, Smoothest reflectance functions: II. Complete results, J. Opt. Soc. Am. A, vol. 7, No. 12, pp. 2208–2222 (Dec. 1990).

C. van Trigt, Metameric blacks and estimating reflectance, J. Opt. Soc. Am. A, vol. 11, No. 3, pp. 1003–1024 (Mar. 1994).

C. van Trigt, Estimating reflectance: How to discount the illuminant, Die Farbe, vol. 40, pp. 9–24 (1994).

*Primary Examiner*—Michael Lee
*Attorney, Agent, or Firm*—David P. Gordon; Thomas A. Gallagher; David S. Jacobson

[57] ABSTRACT

The signals received by the three cameras of any color video system are determined by the reflectance properties of the objects in the scene and the spectral distribution function of the illuminant. Since the information of interest to the observer is determined by the scene and not by the illuminant i.e. what kind of objects, characterized by their reflectance properties, are in the scene, not how they are illuminated, it is desirable to correct the signals from the scene for the illuminant before the information is displayed on the CRT. According to the invention, a color video system employs the achromatic variable $\xi$, where $\xi$, $0 \leq \xi \leq 1$, and preferably also the chromatic variables $\eta$, $\zeta$, with the following characteristic properties: (1) they are illuminant-independent, (2) they have a representation invariant for a transformation of color matching functions, (3) they substantially optimize the system's power of discrimination under a reference illuminant, and (4) they can be chosen such that they are substantially perceptually meaningful.

17 Claims, 1 Drawing Sheet

COLOR VIDEO SYSTEM WITH ILLUMINANT-INDEPENDENT PROPERTIES

This application is a continuation-in-part of application Ser. No. 08/700,542 filed Aug. 27, 1996, which is a 371 of PCT/NL94/00049 filed on Feb. 28, 1994, the complete disclosure of which is incorporated by reference herein.

BACKGROUND OF THE INVENTION

1. Field of the Invention

The present invention relates to color video systems.

2. State of the Art

The signals received by the three cameras of any color video system are determined by the reflectance properties of the objects in the scene and the spectral distribution function of the illuminant. Since the information of interest to the observer is determined by the scene and not by the illuminant i.e. what kind of objects, characterized by their reflectance properties, are present in the scene, not how they are illuminated, it is desirable to correct the signals from the scene for the illuminant before the information is displayed on the CRT, illuminant-correction enables the signals, to be displayed by the CRT, to be in standardized form, determined by the scene, so that the color rendering problem at the CRT can be solved independently of the accidental and unknown light source that illuminates the scene to be rendered on the CRT. The correction must take place at camera level because only there information about the illuminant is available. Such a correction has also additional advantages. The signals from the cameras are contaminated by the properties of the accidental illuminant. In particular, different signals are produced when tungsten lighting or an illuminant like $D_{65}$ is used for illuminating the same scene. Illuminant-correction enables a better definition of the signals to be transmitted so that e.g. less bandwidth is needed for their transmission.

It is generally accepted that the human visual system is able to discount the illuminant i.e. to correct the information from the outside world for the presence of the illuminant. It is observed that nature looks similarly at dawn and at sunset, though the spectral distribution function of the incident light is very different. For more than a century the contention is whether the effect, called color constancy, is to be explained on the basis of signal processing or that memory is the agent. In the latter case, implementation in an artificial system would require a large memory, probably not practical. The hypothesis in the former case is that, using information about the illuminant, it may be possible to obtain information about reflectance only i.e. to discount the illuminant. Illuminant-correction creates a more or less stable world with obvious advantages for detection purposes. Discounting the illuminant can be achieved if a transformation can be defined which transforms the illuminant-dependent signals from the cones to variables which would result if the illuminant were a given, fixed reference source. An the equal-energy spectral distribution $E(\lambda)$, see definition (1). The fact that $E(\lambda)$ will be taken as the reference source=1 below everywhere is not exploited so that any desirable reference source can be used instead, as long as it remains fixed. Any such transformation requires knowledge about the actual illuminant. Furthermore, since many different illuminants exist that are visually equivalent in the sense that their chromaticity coordinates are equal, the correction cannot be complete. At most, almost illuminant-independent variables can be produced. They correspond to certain, by definition illuminant-independent properties of reflectance, explaining color constancy. Information about these properties cannot be obtained exactly but can only be estimated in view of the fact that three signals do not contain sufficient information to recover the complete behavior of the reflectance as a function of wavelength, even if the illuminant were completely known. Since estimates are subject to uncertainty, we may associate an error bar with the estimate of the illuminant-independent property of reflectance, hence to the variable in question, due to the lack of knowledge of the visual system about both the illuminant and the reflectance as functions of wavelength. Suppose, in addition, that the illuminant varies over a set of well-behaved illuminants and that illuminant-correction is applied. Since the correction is necessarily incomplete, the error bar associated with the illuminant-independent property of reflectance is somewhat enlarged but that does not affect the face that such an error bar exists. If the variables correspond closely to perceptually meaningful variables, then it may be expected that the resulting problem is accounted for by the color metrics, employed by the human visual system. If the error bar is small, i.e. if all uncertainties the visual system has to cope with are small, then the just-noticeable differences of the signal employed by the human visual system can likewise be chosen to be small. On the other hand, if the error bar is not particularly small, then these just-noticeable differences must be chosen correspondingly larger. Thus, preferably, the almost illuminant-independent variables are to be chosen such they they correspond as much as possible with perceptually meaningful variables so that 'errors' in illuminant-correction are ignored, due to the color metrics, leading to improved image quality. If the error bars of the variables could reasonably accurately be estimated, then the result could be exploited in the data transmission because it does not make sense to transmit variables with a greater precision than allowed by their definition, leading to a saving of bandwith. In present color video systems the normalization of the white point of the actual illuminant to that of a fixed illuminant e.g. $D_{85}$ provides some illuminant-correction.

SUMMARY OF THE INVENTION

The invention proposes to employ in a color video system the achromatic variable $\xi$, $0 \leq \xi \leq 1$, and preferably also the chromatic variables $\eta$, $\zeta$ with the following characteristic properties:

1. they are almost illuminant-independent,
2. they have a representation invariant for a transformation of the color matching functions,
3. preferably, they are chosen such that they optimize the system's power of discrimination under the reference illuminant,
4. preferably, they are chosen such that they are close to perceptually meaningful achromatic and chromatic variables.

Let the scene in front of the cameras be illuminated by some source $S(\lambda) \neq E(\lambda)$ in general, and consider the object with (unknown) reflectance $\rho(\lambda)$ that gives rise to the three camera signals, according to the invention. The variables $$\xi = \int \rho_0(\lambda) P(\lambda) d\lambda; \quad \eta = \int \rho_0(\lambda) C_1(\lambda) d\lambda; \quad \zeta = \int \rho_0(\lambda) C_2(\lambda) d\lambda \qquad (1)$$

where $\rho_0(\lambda)$, known as a function of wavelength, the estimate of $\rho(\lambda)$ under $S(\lambda)$ with representation invariant for a transformation of the color matching functions, can be constructed using the methods as disclosed in C. van Trigt, J. Opt. Soc. Am A7 1891–1904 (1990) and C. van Trigt, J.

Opt. Soc. Am A7 2208–222 (1990) from the signals produced by $\rho(\lambda)$. The achromatic function $P(\lambda)$ and the chromatic functions $C_i(\lambda)$ in Eq.(1) have the following characteristic properties:

a. they define a property with a small range,
b. their representations are invariant for a transformation of the color matching functions,
c. preferably, the chromatic functions satisfy the orthogonally condition which ensures optimal power of discrimination,
d. preferably, they are chosen to correspond closely to perceptually meaningful achromatic and chromatic variables, property 1. The advantages of using almost illuminant-independent variables i.e. variables with values almost equal to those if $S(\lambda)$, illuminating the scene, would be $E(\lambda)$, has been discussed in the background of the invention above. In addition, if the chromatic variables provide optimal power of discrimination under the reference source, the power of discrimination will be good under another source.

property 2. This property ensures that the produced achromatic and chromatic signals do not depend on the choice of the chromaticity coordinates of the phosphor primaries and those of the white point, used in the definition of the camera sensitivities. When the variables are received, the chromaticity coordinates of the phosphor primaries and those of the white point of the CRT, or, in general, the particular properties of the display unit, determine the (local) decoding transformation from almost illuminant-independent variables to the variables employed for the display, see below. Hence, different families of CRT distinguished by different phosphor primaries and choices of the white point can be served by the same signal. As a result, the emitter- and receiver systems are weakly coupled, enabling optimization of local performance.

property 3. The system's power of discrimination is optimal under the reference source if a certain orthogonality condition is satisfied.

property 4. Comparison with experiment shows that $\xi$ corresponds closely to perceptual lightness, of importance for discrimination in space, and that the chromatic functions can be chosen such that their zeros agree with the known positions of unique green (495–410 nm), unique blue (476–480 nm) and unique yellow (577–580 nm). Note that luminance is known to be a bad predictor of the lightness of, in particular, blue colors (Heimhoitz-Kohlrausch effect).

Figure 1:
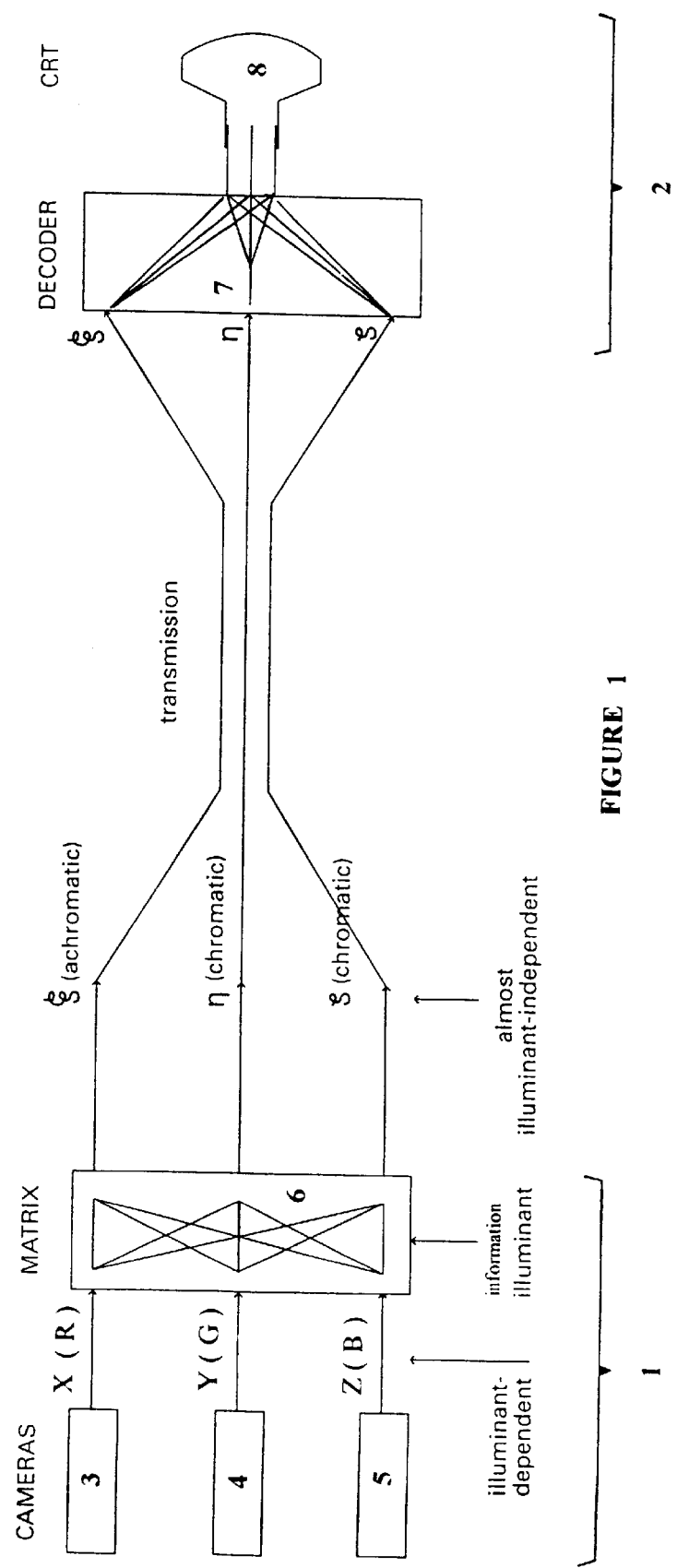
FIG. 1 shows a video color system according to the invention.

DETAILED DESCRIPTION OF THE PREFERRED EMBODIMENT preliminary

The definitions, methods of calculating the terms $\rho_0(\lambda)$, $P(\lambda)$, $C_i(\lambda)$, i=1,2 and of the integrals in Eq.(1) will be given herein. Because all quantities in the definition of the achromatic and chromatic variables are invariant for a transformation of the color matching functions, we employ, without loss of generality, the CIE system i.e. we work with the tristimulus values of $\rho(\lambda)$ instead of its camera signals, see the FIGURE. However, the camera signals may be substituted throughout, in the implementation of the visual system Eq.(1) will be used in two different ways: at the transmitter the known tristimulus values of $\rho(\lambda)$ under the illuminant $S(\lambda)$ fix $\rho_0(\lambda)$ and thus the variables $\xi$, $\eta$, $\zeta$ in Eq.(1). At the receiver the variables are known and Eq.(1) defines an inverse transformation producing for display purposes the tristimulus values of $\rho_0(\lambda)$ which under the reference source has the same appearance as $\rho(\lambda)$ would have under that source.

System definitions def.1. $\lambda_b$ and $\lambda_e$ wavelengths of the begin and end points of the visual range. Integration with respect to the wavelength will always be understood as being over the entire visual range, except if explicitly stated otherwise. $S(\lambda)$ spectral distribution function of the illuminant, non-negative everywhere. $E(\lambda)$ equal-energy spectral distribution function, constant (=1) for all $\lambda$, reference illuminant. $E(\lambda)$ may be replaced by any other fixed illuminant like e.g. $D_{88}$, $\rho(\lambda)$ reflectance function, a function of wavelength satisfying $0 \leq \rho(\lambda) \leq 1$.

def.2. $\bar{x}(\lambda)$, $\bar{y}(\lambda)$, $\bar{z}(\lambda)$ CIE 1931 color matching functions, but also CIE 1964 functions may be used. $R(\lambda)$, $G(\lambda)$, $B(\lambda)$ camera sensitivities, linearly independent combinations of the CIE 1931 color matching functions or close approximations to such combinations, determined by the chromaticity coordinates of the phosphor primaries and those of the white point in question. X, Y, Z tristimulus values of $\rho(\lambda)$ under the illuminant with spectral distribution function $S(\lambda)$ defined by the color equations $$\int\rho(\lambda)S(\lambda)\bar{x}(\lambda)d\lambda=X;\ \int\rho(\lambda)S(\lambda)\bar{y}(\lambda)d\lambda=Y;\ \int\rho(\lambda)S(\lambda)\bar{z}(\lambda)d\lambda=Z$$

Chromaticity coordinates and object-color solid belonging to $S(\lambda)$ are defined as usually, (see G. Wyszecki and W. S. Stiles, Color Science (Wiley, New York, 1982). R, G, B camera signals i.e. the right-hand sides of the color equations if the camera sensitivities $R(\lambda)$, $G(\lambda)$, $B(\lambda)$ are substituted for the color matching functions $\bar{x}(\lambda)$, $\bar{y}(\lambda)$, $\bar{z}(\lambda)$. $X_0$, $Y_0$, $Z_0$ tristimulus values obtained by substituting $\rho(\lambda)=1$ in the color equations i.e. the tristimulus values of the illuminant $S(\lambda)$. The customary definitions result, (see G. Wyszecki and W. S. Stiles, Color Science (Wiley, New York, 1982), if $S(\lambda)$ is normalized such that $Y_0=100$ cd/m². This may be assumed without loss of generality. $X_E$, $Y_E$, $Z_E$ tristimulus values of the reference illuminant $E(\lambda)$.

def.3. $\rho_0(\lambda)$ reflectance function, constructible as a function of $\lambda$ for any given X, Y, Z within the object-color solid belonging to $S(\lambda)$, a metameric (see G. Wyszecki and W. S. Stiles, Color Science (Wiley, New York, 1982) estimate of the reflectance function $\rho(\lambda)$, not known as a function of wavelength, with the same tristimulus values under $S(\lambda)$, and in general reasonably representative of the latter function, see C. van Trigt, J. Opt. Soc. Am A7 1891–1904 (1990) and C. van Trigt, J. Opt. Soc. Am A7 2208–222 (1990) for construction methods. Its representation is invariant for a transformation of the color matching functions. In general $\rho_0(\lambda)$ depends weakly on $S(\lambda)$. Variants of the construction methods in Refs.(1)–(2) may also be used, if estimates $\rho_0(\lambda)$ result that are reasonably representative of reflectances $\rho(\lambda)$ occuring in practice, i.e. in general smooth. In particular, the smoothness measure in Eq.(3) of C. van Trigt, J. Opt. Soc. Am A7 1891–1904 (1990) may be replaced by any other one with the same axiomatic properties. Essentially different methods of constructing estimates $\rho_0(\lambda)$ exist, e.g. the principal components analysis, and are applicable if the necessary condition $0 \leq \rho_0(\lambda) \leq 1$ is satisfied, not the case in general.

def.4. $S_0(\lambda)$ spectral distribution function-constructible as a function of $\lambda$ for any given $X_0$, $Y_0$, $Z_0$ within the object-color solid belonging to $E(\lambda)$ a metameric estimate of the spectral distribution $S(\lambda)$. For construction methods, see Ref.(1), replacing in Eq.(2) $S(\lambda)$ by $E(\lambda)$, substituting $S(\lambda)/E(\lambda)$ for $\rho(\lambda)$ and dropping in Eq.(1) the condition $S(\lambda)/E(\lambda) \leq 1$, and Ref.(2). The same variants of these methods, as discussed in definition (3) are applicable. Any parametric representation of $S(\lambda)$ or good approximation to $S(\lambda)$ with at most three parameters can be converted into a representation of or a good approximation to $S(\lambda)$ by a similar function $S_0(\lambda)$ by substituting $S(\lambda)$ or its approximation into the color equations with $\rho(\lambda)=1$ everywhere and calculating the integrals. There result three linear equations expressing $X_0, Y_0, Z_0$ in terms of the parameters. Upon inversion of the linear system, the parameters are expression terms of $X_0, Y_0, Z_0$ so that measurement of $X_0, Y_0, Z_0$, apart from a common multiplicative constant (e.g. their chromaticity coordinates) yields the values of the parameters and thus the representation by $S_0(\lambda)$. Examples are the representations of daylight and those of black body radiators of temperature T degrees Kelvin, see Ref.(3).

def.5. $P(\lambda)$ achromatic function and $C(\lambda)$ chromatic function and their undetermined integrals defined by $$P(\lambda) = \left(\tau_1 \frac{\bar{x}(\lambda)}{X_E} + \tau_2 \frac{\bar{y}(\lambda)}{Y_E} + \tau_3 \frac{\bar{z}(\lambda)}{Z_E}\right) E(\lambda);$$

$$\sum_{i=1}^{3} \tau_j = 1 \text{ and } P^{(1)}(\lambda) = \int_{\lambda_b}^{\lambda} P(\lambda') d\lambda'$$

$$C(\lambda) = \left(\chi_1 \frac{\bar{x}(\lambda)}{X_E} + \chi_2 \frac{\bar{y}(\lambda)}{Y_E} + \chi_3 \frac{\bar{z}(\lambda)}{Z_E}\right) E(\lambda);$$

$$\sum_{i=1}^{3} \chi_i = 0 \text{ and } C^{(1)}(\lambda) = \int_{\lambda_b}^{\lambda} C(\lambda') d\lambda'$$

def.6. $r(\lambda)$ metameric black with respect to $S(\lambda)$ i.e. a solution of the equations $$\int r(\lambda) S(\lambda) \bar{x}(\lambda) = 0;\ \int r(\lambda) S(\lambda) \bar{y}(\lambda) = 0;\ \int r(\lambda) S(\lambda) \bar{z}(\lambda) = 0$$

It can be shown that a metameric black has at least three zeros. Metameric blacks are in general illuminant-dependent but representations can be given such that this dependence is weak. A set of metameric blacks $r_k(\lambda) \Delta K = 1, 2 \ldots$ is complete if any reflectance function $\rho(\lambda)$ with tristimulus values X, Y, Z under the illuminant $S(\lambda)$ can be written as $$\rho(\lambda) = \rho_0(\lambda) + \sum_{k=1}^{\infty} c_k r_k(\lambda)$$

for certain values of the coefficients $c_k$, inaccessible to the visual system, thus hidden i.e. stochastic variables. The expansion is called the metameric black expansion of $\rho(\lambda)$. The values of the coefficients in the expansion are small if $\rho_0(\lambda)$ is reasonably representative of $\rho(\lambda)$. Multiply the metameric black expansion of $\rho(\lambda)$ under $S(\lambda)$ by one of the functions $P(\lambda)$ or $C(\lambda)$ in definition (5), integrate and consider e.g.

$$\int \rho(\lambda) P(\lambda) d\lambda = \int \rho_0(\lambda) P(\lambda) d\lambda + \sum_{k=1}^{\infty} c_k \int r_k(\lambda) P(\lambda) d\lambda$$

The first term on the left-hand side is interpreted as an illuminant-independent property of $\rho(\lambda)$. Its value is in a range around the value of the first term on the right-hand side, the estimate of the value, which can be calculated explicitly, see definition (3). The extend of the range is determined by the values the sum can assume if the coefficients $c_k$ are varied within reasonable bounds. Achromatic and chromatic functions $P(\lambda)$, $C(\lambda)$ define properties of reflectance with a small range if the integrals $$\int r_k(\lambda) P(\lambda) d\lambda;\ \int r_k(\lambda) C(\lambda) d\lambda$$

have (as) small (as possible) values for all values of k and for all well-behaved illuminants $S(\lambda)$ i.e. the coefficients in the representations of the achromatic and chromatic functions in definition (5) are to be chosen such that (as much as possible) cancellation occurs in the last integrals. Such functions with characteristic property (a) are constructed in definitions (9), (10) and (12).

def.7. The variables $\xi$, $\eta$, $\zeta$ in Eq.(1) are almost illuminant-independent, characteristic property (1), if the functions $P(\lambda)$, $C_i(\lambda)$ i=1.2 in definition (5) define properties with a small range. By assumption the sum in definition (6), third equation, has a (as) small (as possible) value and may be neglected. The first term on the right-hand side is almost equal to the term on the left-hand side, which is illuminant-independent by definition, with value equal to the one it would possess if the illuminant were the reference source $E(\lambda)$. If $S(\lambda)=E(\lambda)$, the sum vanishes exactly, see definitions (5) and (6), so that the values of the variables $\xi_1, \eta, \zeta$ under $S(\lambda)$ are almost equal to their values under the fixed reference source for the same reflectance.

def.8. A representation of a function as a linear combination of the color matching functions, see definition (5), is invariant for a transformation of the color matching functions if the non-singular transformation that transforms the CIE color matching functions into the functions $x'(\lambda)$, $y'(\lambda)$, $z'(\lambda)$ induces a transformation of the coefficients multiplying the CIE functions, the resulting coefficients being denoted by adding a prime, such that the function remains the same in the primed system. Such functions with characteristic property (b) are constructed in definitions (9), (10) and (12).

def.9. The achromatic function $$P(\lambda) = E(\lambda) \begin{vmatrix} \bar{x}(\lambda) & \bar{x}(\lambda_b) & \bar{x}(\lambda_e) \\ \bar{y}(\lambda) & \bar{y}(\lambda_b) & \bar{y}(\lambda_e) \\ \bar{z}(\lambda) & \bar{z}(\lambda_b) & \bar{z}(\lambda_e) \end{vmatrix} \begin{vmatrix} X_E & \bar{x}(\lambda_b) & \bar{x}(\lambda_e) \\ Y_E & \bar{y}(\lambda_b) & \bar{y}(\lambda_e) \\ Z_E & \bar{z}(\lambda_b) & \bar{z}(\lambda_e) \end{vmatrix}^{-1}$$

is everywhere non-negative. Its integral equals unity. The integral on the left hand side of the third equation, definition (6), is interpreted as a weighted mean of $\rho(\lambda)$. It can be proved that the weighted mean has a small range, characteristic property (a). The achromatic variable $\xi$ in Eq.(1) satisfies $0 \leq \xi \leq 1$ and is almost illuminant-independent, characteristics property (1). Expand the first determinant according to its first row. The representation satisfies definition (5). Choosing, see definition (1), $\lambda_b=360$ nm and $\lambda_e=780$ nm we have in good approximation $\tau_1=-0.5088$, $\tau_2=1.4088$, $\tau_3=0.1000$. Replace everywhere in the determinants the CIE color matching functions by functions $x'(\lambda)$, $y'(\lambda)$, $z'(\lambda)$, related to the CIE color matching functions by some non-singular transformation, for example, the camera sensitivities. Since the determinant of the transformation matrix cancels in the quotients of the determinants, the primed and CIE functions define the same function $P(\lambda)$ i.e. its representation is invariant for a transformation of the color matching functions, see definition (8) and characteristic property (b). Hence, $\xi$ has characteristic property (2). The two additional achromatic functions obtained by replacing in the second resp. third column of both determinants $\bar{x}(\lambda_b)$ by $d\bar{x}(\lambda_c)/d\lambda$ etc. resp. $\bar{x}(\lambda_a)$ by $d\bar{x}(\lambda_b)/d\lambda$ etc. are examples of functions (everywhere positive with integral equal to unity and) invariant for a transformation of the color matching functions, which do not have a sufficiently small range. Such and similarly constructed functions may be used below to define chromatic variables with the characteristic properties, in particular characteristic property (2), except characteristic property (1).

def.10. Define the undetermined integrals $$e_1(\lambda) = \int_{\lambda_b}^{\lambda} \frac{\bar{x}(\lambda')E(\lambda')}{X_E} d\lambda';$$

$$e_2(\lambda) = \int_{\lambda_b}^{\lambda} \frac{\bar{y}(\lambda')E(\lambda')}{Y_E} d\lambda';$$

$$e_3(\lambda) = \int_{\lambda_b}^{\lambda} \frac{\bar{z}(\lambda')E(\lambda')}{Z_E} d\lambda'$$

the functions $f_i(\lambda)$ equal to $e_i(\lambda)$ if $E(\lambda')$ and $X_E, Y_E, Z_E$ are resp. replaced by $S(\lambda')$ or $S_0(\lambda')$ and $X_0, Y_0, Z_0$. Note that all integrals are independent of the amplitudes of the illuminants. Define the symmetric, positive definite, thus invertible, matrices A and E with elements for i,j=1,2,3

$$a_{i,j} = \int f_i(\lambda)f_j(\lambda)d\lambda; \ e_{i,j} = \int e_i(\lambda)e_j(\lambda)d\lambda \text{ and}$$

$$h_i(\lambda_0) = \int_{\lambda_0}^{\lambda_e} e_i(\lambda)d\lambda; \ \lambda_b \leq \lambda_0 \leq \lambda_e$$

Define the coefficients in the representations of the achromatic functions in definition (5), which will be used in addition to the achromatic function in definition (9) for the construction of the chromatic functions, to be the solutions of $$E\begin{bmatrix}\tau_1(\lambda_0)\\\tau_2(\lambda_0)\\\tau_3(\lambda_0)\end{bmatrix} = y(\lambda_0)\begin{bmatrix}1\\1\\1\end{bmatrix} + \begin{bmatrix}h_1(\lambda_0)\\h_2(\lambda_0)\\h_3(\lambda_0)\end{bmatrix} \text{with} \sum_{i=1}^{3}\tau_i(\lambda_0) = 1$$

The latter condition determines $y(\lambda_0)$. It can be proved that the resulting achromatic functions are invariant for a transformation of the color matching functions for any $\lambda_0$, characteristic property (b). Define $$\text{Min}(\lambda_0) = y(\lambda_0) + \lambda_e - \lambda_0 - \sum_{i=1}^{3}\tau_i(\lambda_0)h_j(\lambda_0)$$

The function $d\text{Min}(\lambda_0)/d\lambda_0=0$ has solutions of which three correspond to minima of $\text{Min}(\lambda_0)$ (near $\lambda_0=449,539$ and 608 nm). It can be proved that the achromatic functions in definition (5) with coefficients $\tau_i(\lambda_0)$, the solutions of the third equation for the values of $\lambda_0$ corresponding to the minima or in a neighborhood of ±30 nm of them, define properties with a small range, characteristics property (a). Denote the achromatic functions corresponding to these wavelengths and in that order by $P_i(\lambda)$, i=1,2,3. In the representation of definition (5) we have with good accuracy $\tau_1$=0.2183, −1.2313, 1.9085; $\tau_2$=−0.03107, 2.1514, −0.6282; $\tau_3$=1.0924, 0.0799, −0.2803 for resp, i=1,2,3. Achromatic functions corresponding to values of $\lambda_0$ in the mentioned neighborhoods of 449,539 and 608 nm may also be used. Their values of the coefficients $\tau_i(\lambda_0)$ are similarly defined but differ numerically from those mentioned.

def.11. Optimal power of discrimination is present if, when two visual system variables remain fixed, the third one can vary as much as possible i.e. to take as many different values as possible. It can be proved that the visual system's power of discrimination is optimal under the reference source $E(\lambda)$ if the two chromatic functions, linearly independent of $P(\lambda)$, satisfy for i≠j the orthogonality condition $$\int c_i^{(1)}(\lambda)c_i^{(1)}(\lambda)\frac{d\lambda}{\lambda_e - \lambda_b} = \delta_{1,j}\delta_{1,j} = 1, \ i = j. = 0, \ i \neq j$$

Without loss of generality the normalization of the coefficients in the representation of the chromatic functions in definition (5) may be chosen such that this equation is also valid for i=j, providing the normalization condition of the chromatic functions. Chromatic functions with characteristic property (c) are constructed in definition (12).

def.12. If $C_1(\lambda)$ are two particular chromatic functions, satisfying the orthogonality and normalization conditions in definition (11), the general chromatic functions which satisfy them, can be expressed by $$\begin{bmatrix}C_1(\lambda)\\\pm C_2(\lambda)\end{bmatrix} = \begin{pmatrix}\cos\phi & -\sin\phi\\\sin\phi & \cos\phi\end{pmatrix}\begin{bmatrix}\hat{C}_1(\lambda)\\\hat{C}_2(\lambda)\end{bmatrix}; \ -\pi < \phi \leq \pi$$

Define for i,j=1,2,3 j≠i, $N_{i,j}$ and the normalization constant $N_i$, the positive square root of $$N_i^2 = \int [P_i^{(1)} - p^{(1)}(\lambda)]^2 \frac{d\lambda}{\lambda_e - \lambda_b};$$

$$N_{i,j} = N_i^{-1}N_j^{-1}\int[P_i^{(1)}\lambda - p^{(1)}(\lambda)][P_j^{(1)}(\lambda) - p^{(1)}(\lambda)]\frac{d\lambda}{\lambda_e - \lambda_b} < 1$$

The two particular functions, defined by $$\hat{C}_1(\lambda) = \frac{1}{\hat{N}_1}\Big(\frac{P_1(\lambda) - P(\lambda)}{N_1} \pm \frac{P_3(\lambda) - P(\lambda)}{N_3}\Big);$$

$$\hat{C}_2(\lambda) = \frac{1}{\hat{N}_2}\Big(\frac{P_1(\lambda) - P(\lambda)}{N_1} \mp \frac{P_3(\lambda) - P(\lambda)}{N_3}\Big)$$

with $\hat{N}_i$, i=1,2 the positive square roots of $$\hat{N}_{1,3}^2 = 2 \pm 2N_{1,3}; \ \hat{N}_2^2 = 2 \mp 2N_{1,2}$$

are chromatic functions in the sense of definition (5) because, by definition (5), each of the two functions in the numerators within the parentheses is a chromatic function. Because each function within the parentheses is normalized to unity in the sense of the second equation, the chromatic functions on the left-hand side satisfy the orthogonality and normalization conditions in definition (11). They define a property with a small range and have a representation invariant for a transformation of the color matching functions, because the achromatic functions, see definitions (9) and (10), do so. The general chromatic functions in the first equation thus satisfy the characteristic properties (a), (b) and (c). Evaluation of the expressions for the particular chromatic functions, choosing the lower sign in thee third equation, yields in good approximation $\chi_1$=−3.743, 8.657; $\chi_2$=1.519, −9.698; $\chi_3$=2.224, 1.041 for resp.i=1.2 in definition (5). The first chromatic function has one zero, the second one two. Other special solutions may be constructed similarly, using other linear combinations of the functions $P_1(\lambda)$ and $P(\lambda)$, for example $P_3(\lambda)$ could be replaced by $(P_2(\lambda)+P_3(\lambda))/2$ leading to properties with a similar small, or even somewhat smaller, range, dependent on the nature of the actual reflectance functions present in the scene. From the construction and definitions (7) and (8) it follows that the chromatic variables $\eta$, $\zeta$ in Eq.(1) possess the characteristic properties (1), (2) and (3).

def.13. If the angle $\phi$ in the first equation of definition (12) is chosen to satisfy $0.34\pi \leq \phi \leq 0.43\pi$ then chromatic functions result with one and two zeros. The functions $C_1(\lambda)$ have one zero in the range 495–511 nm and the functions $C_2(\lambda)$ two zeros in resp. the ranges 476–480 and 577–580 nm i.e. in the ranges where the experimentally determined unique hues green, blue and yellow are known to be situated. These theoretical chromatic functions correspond closely to perceptually meaningful functions, characteristic property (d).

def.14. Given the tristimulus values of the object in the scene with reflectance function $\rho(\lambda)$ illuminated by the light source with spectral distribution function $S(\lambda)$, we can construct $\rho_0(\lambda)$ in definition (3). The achromatic and chromatic functions having been constructed as expounded above, we calculate all integrals in Eq.(1), using the representations in definition (5) with the calculated values of the coefficients. In the principal domain, see Ref.(1), where most colors in practice have their tristimulus values, $\rho_0(\lambda)$ possesses a representation, linear in the quotients $X/X_0$, $Y/Y_0$, $Z/Z_0$ and we have in Eq.(1) from definition (5)

$$\xi = \begin{bmatrix} \tau_1 \\ \tau_2 \\ \tau_3 \end{bmatrix} \begin{bmatrix} X/X_0 \\ Y/Y_0 \\ Z/Z_0 \end{bmatrix} + \begin{bmatrix} \Delta\tau_1 \\ \Delta\tau_2 \\ \Delta\tau_3 \end{bmatrix} . A^{-1} \begin{bmatrix} X/X_0 - \rho_0(\lambda_e) \\ Y/Y_0 - \rho_0(\lambda_e) \\ Z/Z_0 - \rho_0(\lambda_e) \end{bmatrix};$$

$$\text{wherein, with } \begin{bmatrix} \pi_1 \\ \pi_2 \\ \pi_3 \end{bmatrix} = A^{-1} \begin{bmatrix} 1 \\ 1 \\ 1 \end{bmatrix}$$

$$\Delta\tau_j = \int \left( P^{(1)}(\lambda) - \sum_{i=1}^{3} \tau_i f_i(\lambda) \right) f_j(\lambda) d\lambda;$$

$$\rho_0(\lambda_e) = \left( \pi_1 \frac{X}{X_0} + \pi_2 \frac{Y}{Y_0} + \pi_3 \frac{Z}{Z_0} \right) / \sum_{i=1}^{3} \pi_i$$

In this equation the dot (.) means inner product. The expressions for the chromatic variables $\eta$, $\zeta$ are obtained from the same equation by replacing $\tau_i$, $\Delta\tau_i$ by $\chi_i$, $\Delta\chi_i$, and $P^{(1)}(\lambda)$ by $C^{(1)}(\lambda)$, see definition (5). A few observations: the expressions for $\xi$, $\eta$, $\zeta$ are linear in the quotients $X/X_0$, $Y/Y_0$, $Z/Z_0$. The three sums of the coefficients $a_i$, $b_i$, $c_i$ multiplying the quotients in the case of $\xi$, $\eta$, $\zeta$, defined by the right-hand side, equal 1(0) in the case of $\xi$ ($\eta$, $\zeta$) since the second term on the right-hand side vanishes for $X=X_0$, $Y=Y_0$, $Z=Z_0$. If $S(\lambda)=E(\lambda)$ the coefficients $\Delta\tau_j$ vanish. The quotients are independent of the amplitude of $S(\lambda)$ and so are the functions $f_j(\lambda)$ and the elements of the matrix A, see definition (10). If $S(\lambda)$ is completely known as a function of wavelength, for example if it is a black body radiator of known temperature T, the functions $f_j(\lambda)$ can be calculated numerically and all expressions containing them. In general, this is not the case and only its chromaticity coordinates are known. If so, the chromaticity coordinates enable to construct $S_0(\lambda)$ in definition (4), apart from its amplitude which drops in the final formula and thus can be arbitrarily fixed. The substitution of $S_0(\lambda)$ for $S(\lambda)$ reduces this case to the former one. Outside the principal domain, the integrals in Eqs.(1) can also be evaluated, see Ref.(2), but more involved expressions result. The linear expressions are of sufficient accuracy in practice and simple to implement.

def. 15. The actual illuminant $S(\lambda)$ with tristimulus values $X_0$, $Y_0$, $Z_0$ can be represented as $$S(\lambda) = S_0(\lambda) + E(\lambda) \sum_{n=1}^{\infty} c_n r_n(\lambda)$$

where $S_0(\lambda)$ is defined in definition 4 and the $r_n(\lambda)$ are metameric blacks with respect to $E(\lambda)$, see definition 6. Any spectral distribution function equal to the right-hand side of this equation for some choice of the coefficients $c_n$ is called an estimate of $S(\lambda)$. The use of an estimate of $S(\lambda)$ instead of $S(\lambda)$ itself in the present definitions may endow achromatic and/or chromatic variables with additional desirable properties. In particular, the use of $S_0(\lambda)$ everywhere in the present formulas instead of $S(\lambda)$ itself yields improved illuminant-independent behavior of the achromatic and/or chromatic variables. Since the total variation of $S_0(\lambda)$ is minimal and its first and second derivatives at both ends of the visual range are zero, see C. van Trigt, J. Opt. Soc. Am A7 1891–1904 (1990), so that $S_0(\lambda)$ is essentially constant near these ends, the metameric blacks $r_k(\lambda)$ with respect to $S_0(\lambda)$, see definition 6, are very close to those with respect to $E(\lambda)$, in particular for large values of k where they converge fast to the blacks with respect to $E(\lambda) =1$ everywhere. Since integrals of blacks with respect to $E(\lambda)$ multiplied with the achromatic or chromatic functions of definition 5 vanish exactly, the functions of definition 5 define properties of reflectance with a, in general, smaller range than in the case of $S(\lambda)$. Since $S_0(\lambda)$ is expressed in terms of repeated undetermined (i.e. indefinite) integrals of the color matching functions and the given tristimulus values $X_0$, $Y_0$, $Z_0$, all integrations in the theory can be simply carried out numerically, yielding simple expressions of the achromatic and chromatic variables.

FIG. 1 shows a color video system comprising a transmitter (1) and receiver (2). The transmitter comprises three cameras (3,4,5) which produce camera signals (R,G,B) in the usual way for transmission or recording purposes, and a device (6) that carries out the matrix operation, defined in Eq.(2) below, in order to produce the signals corresponding to the variables $\xi$, $\eta$, $\zeta$ in Eq.(1) with characteristic properties 1,2,3,4, all together or one or more separatedly, as a result of the definitions of the achromatic function $P(\lambda)$ and the chromatic functions $C_i(\lambda)$, i=1,2 with characteristic properties a,b,c,d, all together or one or more separatedly. The receiver comprises a device (7) that carries out the inverse matrix operation, defined by Eq.(3) below, and a display system (8) (CRT) intended to display the resulting signals. From the system definition, in particular definition (14), it follows that we have the linear equations $$\xi = a_1 \frac{X}{X_0} + a_2 \frac{Y}{Y_0} + a_3 \frac{Z}{Z_0}; \quad \sum_{j=1}^{3} a_j = 1; \quad (2)$$

$$\eta = b_1 \frac{X}{X_0} + b_2 \frac{Y}{Y_0} + b_3 \frac{Z}{Z_0}; \quad \sum_{j=1}^{3} b_j = 0$$

$$\zeta = c_1 \frac{X}{X_0} + c_2 \frac{Y}{Y_0} + c_3 \frac{Z}{X_0}; \quad \sum_{j=1}^{3} c_j = 0$$

where X, Y, Z and $X_0$, $Y_0$, $Z_0$ are resp. the tristimulus values of the object with reflectance function $\rho(\lambda)$ and those of $S(\lambda)$, the spectral distribution function of the light source, illuminating the scene, see definition (2). The coefficients $a_i$, $b_i$, $c_i$ depend on $S(\lambda)$, directly, if known as a function of wavelength, or indirectly if only its chromaticity coordinates are known, in which case it is replaced by its estimate $S_0(\lambda)$, see definition (4). We can prepare a table of the coefficients $a_i$, $b_i$, $c_i$ for a number of illuminants as a function of the parameters characterizing them, for example their temperatures in the case of black body radiators or their chromaticity coordinates in general. Measurement of the chromaticity coordinates of the illuminant by a common chromaticity meter using the perfect reflecting diffuser, see G. Wyszecki and W. S. Stiles, Color Science (Wiley, New York, 1982), enables the determination of the coefficients, which, if e.g. contained in memory, can be read out. Using the information on the illuminant, in whatever form present, for the selection of the matrix elements, the matrix operation is carried out in the block (6) with heading 'matrix' in the FIGURE with as inputs the camera signals.

At the receiver the signals are decoded in agreement with the local requirements. The color matching functions are determined by the values of the chromaticity coordinates of the phosphor primaries and those of the white point of the CRT. Hence, they need not have anything to do with the color matching functions employed by the cameras and accordingly will be denoted by adding primes. We assume for the moment that it is required to render the scene as if it were illuminated by the reference source $E(\lambda)$. As mentioned, the values of the variables on the left-hand side of Eq.(1) are almost equal to those resulting if $S(\lambda)=E(\lambda)$. We evaluate the right-hand sides of Eqs.(1) for the unknown tristimulus values X', Y', Z' and find that they must satisfy, because of their invariance for a transformation of the color matching functions, see definition (8)

$$\xi = \tau'_1 \frac{X'}{X'_E} + \tau'_2 \frac{Y'}{Y'_E} + \tau'_3 \frac{Z'}{Z'_E}; \quad \sum_{j=1}^{3} \tau'_j = 1; \quad (3)$$

$$\eta = \chi'_{1,1} \frac{X'}{X'_E} + \chi'_{1,2} \frac{Y'}{Y'_E} + \chi'_{1,3} \frac{Z'}{Z'_E}; \quad \sum_{j=1}^{3} \chi'_{1,j} = 0$$

$$\zeta = \chi'_{2,1} \frac{X'}{X'_E} + \chi'_{2,2} \frac{Y'}{Y'_E} + \chi'_{2,3} \frac{Z'}{Z'_E}; \quad \sum_{j=1}^{3} \chi'_{2,j} = 0$$

The matrix is numerically inverted and the values of X', Y', Z' follow from the matrix operation in question on inputs $\xi$, $\eta$, $\zeta$ to be carried out in the block (7) with heading 'decoder', see the FIGURE. If it is desirable at the receiver to consider a fixed illuminant $S'(\lambda) \neq E(\lambda)$, for example determined by the particular viewing conditions and/or the choice of the white point, then the primed coefficients in Eq.(3) are replaced by the coefficients $a'_j$, $b'_j$, $c'_j$ calculated from the formula in definition (14) by replacing all quantities by the primed ones. The further procedure is as in the case in which the reference illuminant is $E(\lambda)$

I claim:

1. A color video transmission system, comprising:
   a) a transmitter (1) having three cameras (3,4,5) for producing color signals; and
   b) a receiver (2) having a display system (8) for reproducing the color signals, wherein,
   said transmitter comprises means (6) for producing an achromatic variable $\xi$, $0 \leq \xi \leq 1$, and chromatic variables $\eta$, $\zeta$ with the characteristic property that said achromatic variable and chromatic variables are substantially illuminant-independent, and
   said achromatic and chromatic variables are chosen such that they substantially optimize said color video transmission system's power of discrimination under a reference illuminant.

2. A color video transmission system according to claim 1, wherein:
   said achromatic and chromatic variables have a representation invariant for a transformation of color matching functions.

3. A color video transmission system according to claim 1, wherein:
   said achromatic and chromatic variables are chosen such that they are substantially perceptually meaningful.

4. A color video transmission system according to claim 2, wherein:
   said achromatic and chromatic variables are chosen such that they substantially optimize said color video transmission system's power of discrimination under a reference illuminant, and such that they are substantially perceptually meaningful.

5. A color video transmission system according to claim 2 where a scene having an object with reflectance $\rho(\lambda)$ in front of said cameras is illuminated by a source having a spectral distribution function $S(\lambda) \neq E(\lambda)$, where $E(\lambda)$ is an equal energy spectral distribution function, thereby giving rise to three camera signals, wherein:
   said achromatic and chromatic variables comply with a transformation $\xi = \int \rho_0(\lambda) P(\lambda) d\lambda$, $\eta = \int \rho_0(\lambda) C_1(\lambda) d\lambda$, $\zeta = \int \rho_0(\lambda) C_2(\lambda) d\lambda$, wherein $\rho_0(\lambda)$ is an estimate of said reflectance under $S(\lambda)$, $P(\lambda)$ is an achromatic function, and $C_1(\lambda)$ and $C_2(\lambda)$ are chromatic functions.

6. A color video transmission system according to claim 5, wherein:
   said achromatic and chromatic functions define a property with a small range.

7. A color video transmission system according to claim 5, wherein:
   said achromatic and chromatic functions have representations which are substantially invariant for a transformation of color matching functions.

8. A color video transmission system according to claim 5, wherein:
   said chromatic functions satisfy an orthogonality condition.

9. A color video transmission system according to claim 5, wherein:
   said achromatic and chromatic functions are chosen to correspond closely to perceptually meaningful achromatic and chromatic response functions.

10. A color video transmission system according to claim 6, wherein:
    said achromatic and chromatic functions have representations which are substantially invariant for a transformation of color matching functions,
    said chromatic functions satisfy an orthogonality condition, and
    said achromatic and chromatic functions are chosen to correspond closely to perceptually meaningful achromatic and chromatic response functions.

11. A color video transmission system according to claim 5, wherein:
    said receiver comprises means for producing an universe of said transformation.

12. A receiver for a color video transmission system having a transmitter having three cameras for producing color signals where the transmitter includes means for producing an achromatic variable $\xi$, $0 \leq \xi \leq 1$, and chromatic variables $\eta$, $\zeta$ with the characteristic property that said achromatic variable and chromatic variables are substantially illuminant-independent and having a representation invariant for a transformation of color matching functions, and said achromatic and chromatic variables comply with a transformation $$\xi = \int \rho_0(\lambda) P(\lambda) d\lambda, \quad \eta = \int \rho_0(\lambda) C_1(\lambda), \quad \zeta = \int \rho_0(\lambda) C_2(\lambda),$$

wherein $\rho_0(\lambda)$ is an estimate of a reflectance of an object illuminated by a source having a spectral distribution function $S(\lambda) \neq E(\lambda)$, where $E(\lambda)$ is an equal energy spectral distribution function, $P(\lambda)$ is an achromatic function, and $C_1(\lambda)$ and $C_2(\lambda)$ are chromatic functions, said receiver comprising:

- a decoder which produces an inverse of said transformation; and
- a display system coupled to said decoder, said display system reproducing said color signals.

13. A color video transmitter, comprising:

three cameras (3,4,5) which produce color signals and include means (6) for producing an achromatic variable $\xi$, $0 \leq \xi \leq 1$, and chromatic variables $\eta$, $\zeta$ with the characteristic property that said achromatic variable and chromatic variables are substantially illuminant-independent, wherein a scene having an object with reflectance $\rho(\lambda)$ in front of said cameras is illuminated by a source having a spectral distribution function $S(\lambda) \neq E(\lambda)$, where $E(\lambda)$ is an equal energy spectral distribution function, thereby giving rise to three camera signals, and said achromatic and chromatic variables comply with a transformation $\xi = \int \rho_0(\lambda) P(\lambda) d\lambda$, $\eta = \int \rho_0(\lambda) C_1(\lambda)$, $\zeta = \int \rho_0(\lambda) C_2(\lambda)$, wherein $\rho_0(\lambda)$ is an estimate of said reflectance under $S(\lambda)$, $P(\lambda)$ is an achromatic function, and $C_1(\lambda)$ and $C_2(\lambda)$ are chromatic functions.

14. A color video transmitter according to claim 13, wherein:

said achromatic and chromatic variables have a representation invariant for a transformation of color matching functions.

15. A color video transmitter according to claim 13, wherein:

said achromatic and chromatic variables are chosen such that they are substantially perceptually meaningful.

16. A color video transmitter according to claim 13, wherein:

said achromatic and chromatic functions define a property with a small range.

17. A color video transmitter according to claim 16, wherein:

said achromatic and chromatic functions have representations which are substantially invariant for a transformation of color matching functions, said chromatic functions satisfy an orthogonality condition, and said achromatic and chromatic functions are chosen to correspond closely to perceptually meaningful achromatic and chromatic response functions.

\* \* \* \* \*